United States Patent
Ryu et al.

(10) Patent No.: US 9,681,341 B2
(45) Date of Patent: Jun. 13, 2017

(54) CHANNEL ENHANCEMENT IN MILLIMETER WAVELENGTH WIRELESS ACCESS NETWORKS

(71) Applicant: QUALCOMM Incorporated, San Diego, CA (US)

(72) Inventors: Jung Ho Ryu, Somerville, NJ (US); Sundar Subramanian, Bridgewater, NJ (US); Junyi Li, Chester, NJ (US); Ashwin Sampath, Skillman, NJ (US); Karl Georg Hampel, New York, NY (US)

(73) Assignee: QUALCOMM Incorporated, San Diego, CA (US)

( * ) Notice: Subject to any disclaimer, the term of this patent is extended or adjusted under 35 U.S.C. 154(b) by 303 days.

(21) Appl. No.: 14/308,614

(22) Filed: Jun. 18, 2014

(65) Prior Publication Data

US 2015/0373593 A1 Dec. 24, 2015

(51) Int. Cl.
*H04W 36/00* (2009.01)
*H04W 24/10* (2009.01)
*H04W 72/12* (2009.01)
*H04W 36/30* (2009.01)
(Continued)

(52) U.S. Cl.
CPC ....... *H04W 36/0083* (2013.01); *H04W 24/10* (2013.01); *H04W 72/1226* (2013.01); *H04W 24/02* (2013.01); *H04W 36/20* (2013.01); *H04W 36/30* (2013.01)

(58) Field of Classification Search
None
See application file for complete search history.

(56) References Cited

U.S. PATENT DOCUMENTS

| | | | |
|---|---|---|---|
| 6,782,277 B1 * | 8/2004 | Chen | H01Q 1/246 342/359 |
| 7,146,164 B2 * | 12/2006 | Hunzinger | H01Q 3/2611 370/334 |
| 7,567,807 B2 | 7/2009 | Dunn et al. | |

(Continued)

FOREIGN PATENT DOCUMENTS

| WO | 2006049714 A2 | 5/2006 |
|---|---|---|
| WO | 2013170169 A2 | 11/2013 |

OTHER PUBLICATIONS

International Search Report and Written Opinion—PCT/US2015/033998—ISA/EPO—Aug. 25, 2015.

*Primary Examiner* — Hassan Kizou
*Assistant Examiner* — Roberta A Shand
(74) *Attorney, Agent, or Firm* — Arent Fox, LLP

(57) ABSTRACT

A base station (anchor node) determines that a channel quality for a UE is less than a threshold quality, and commands one or more base stations to adjust a periodicity of performing a beam sweep with the UE based on whether said channel quality is determined to be less than the threshold quality. A base station (mmW base station) adjusts a periodicity for performing a beam sweep with a UE based on a channel quality associated with the UE, and performs the beam sweep at the adjusted periodicity. The beam sweep is a plurality of transmissions of a beam in a plurality of different transmit spatial directions by one of the base station or the UE and a plurality of scans of the beam in a plurality of different scan spatial directions by an other of the one of the base station or the UE.

24 Claims, 13 Drawing Sheets

(51) Int. Cl.
*H04W 36/20* (2009.01)
*H04W 24/02* (2009.01)

(56) References Cited

U.S. PATENT DOCUMENTS

| | | |
|---|---|---|
| 8,089,939 B1 | 1/2012 | Mater et al. |
| 2002/0094843 A1 | 7/2002 | Hunzinger |
| 2003/0195017 A1 | 10/2003 | Chen et al. |
| 2010/0035601 A1 | 2/2010 | Chen et al. |
| 2010/0159930 A1 | 6/2010 | Hagerman et al. |
| 2010/0189079 A1* | 7/2010 | Eichinger ............ H04B 7/0617 370/335 |
| 2011/0065448 A1* | 3/2011 | Song .................... H04B 7/0632 455/452.2 |
| 2013/0065562 A1 | 3/2013 | Singh |
| 2013/0065622 A1* | 3/2013 | Hwang ................ H04W 16/28 455/500 |
| 2013/0155847 A1 | 6/2013 | Li et al. |
| 2013/0258885 A1* | 10/2013 | Yu ........................ H04W 16/28 370/252 |
| 2013/0301619 A1 | 11/2013 | Singh et al. |
| 2015/0358129 A1* | 12/2015 | Ryu ...................... H04L 5/0023 455/438 |

\* cited by examiner

CHANNEL ENHANCEMENT IN MILLIMETER WAVELENGTH WIRELESS ACCESS NETWORKS

BACKGROUND

Field

The present disclosure relates generally to communication systems, and more particularly, to channel enhancement in millimeter wavelength wireless access networks.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology, which operates at or near a 2 GHz carrier frequency. Preferably, these improvements should be applicable to other multi-access technologies and the telecommunication standards that employ these technologies.

One way to meet the increasing demand for mobile broadband is to utilize the millimeter wavelength spectrum in addition to LTE. However, communications using the millimeter wavelength radio frequency band has extremely high path loss and a short range. Beamforming may be used to compensate for the extreme high path loss and short range. Beamforming techniques and methods are currently needed for providing seamless and continuous coverage for a mobile UE in continuously changing wireless environments.

SUMMARY

In an aspect of the disclosure, a method, a computer program product, and an apparatus are provided. The apparatus may be a base station. The base station determines that a channel quality for a user equipment (UE) is less than a threshold quality. In addition, the base station commands one or more base stations to adjust a periodicity of performing a beam sweep with the UE based on whether the channel quality is determined to be less than the threshold quality.

In an aspect of the disclosure, a method, a computer program product, and an apparatus are provided. The apparatus may be a base station. The base station adjusts a periodicity for performing a beam sweep with a UE based on a channel quality associated with the UE. The beam sweep is a plurality of transmissions of a beam in a plurality of different transmit spatial directions by one of the base station or the UE and a plurality of scans of the beam in a plurality of different scan spatial directions by an other of the one of the base station or the UE. The base station performs the beam sweep at the adjusted periodicity.

The apparatus may include a memory and at least one processor coupled to the memory. The at least one processor may be configured to perform the aforementioned steps of the base station. A computer program product stored on a computer-readable medium and comprising code that when executed on at least one processor may cause the at least one processor to perform the aforementioned steps of the base station.

DETAILED DESCRIPTION

Figure 1:
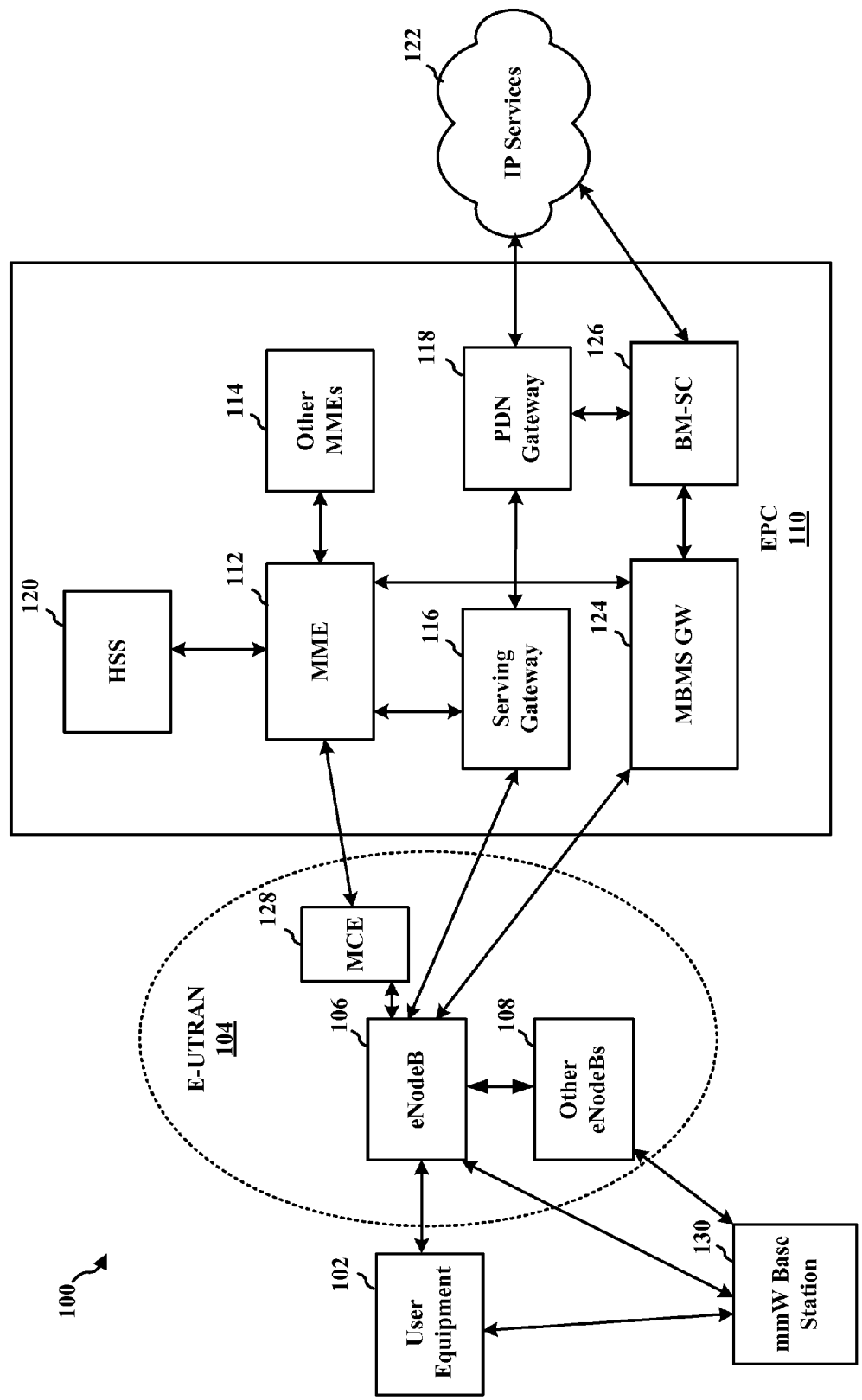
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating a network architecture 100. The network architecture 100 includes an LTE network architecture including one or more user equipment (UE) 102, an Evolved UMTS Terrestrial Radio Access Network (E-UTRAN) 104, and an Evolved Packet Core (EPC) 110. The network architecture 100 further includes a millimeter wavelength (mmW) network that includes an mmW base station 130 and the one or more UE 102. The LTE network architecture may be referred to as an Evolved Packet System (EPS). The EPS may include one or more UE 102, the E-UTRAN 104, the EPC 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
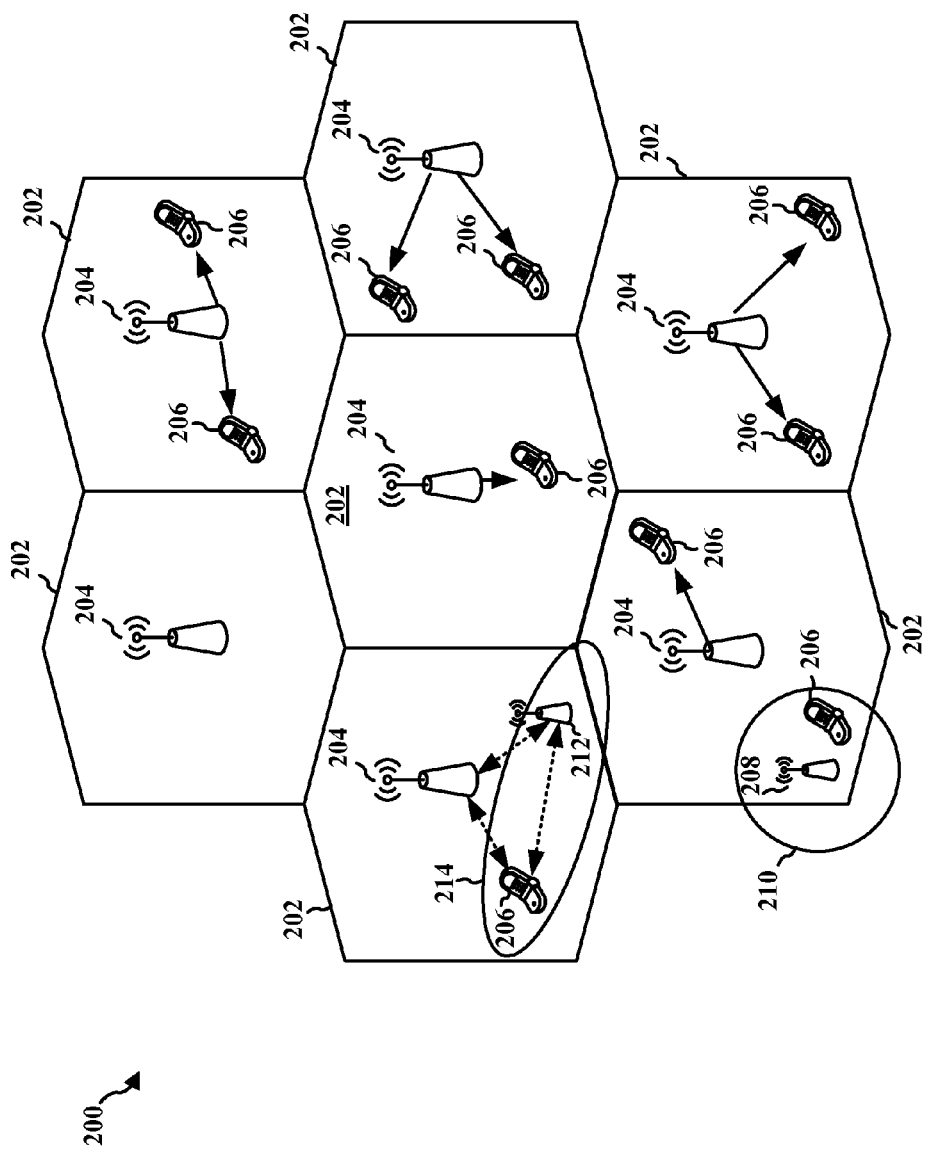
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). One or more mmW base stations 212 may have coverage regions 214 that overlap with one or more of the cells 202. The mmW base stations 212 may communicate with UEs 206 and macro eNBs 204. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
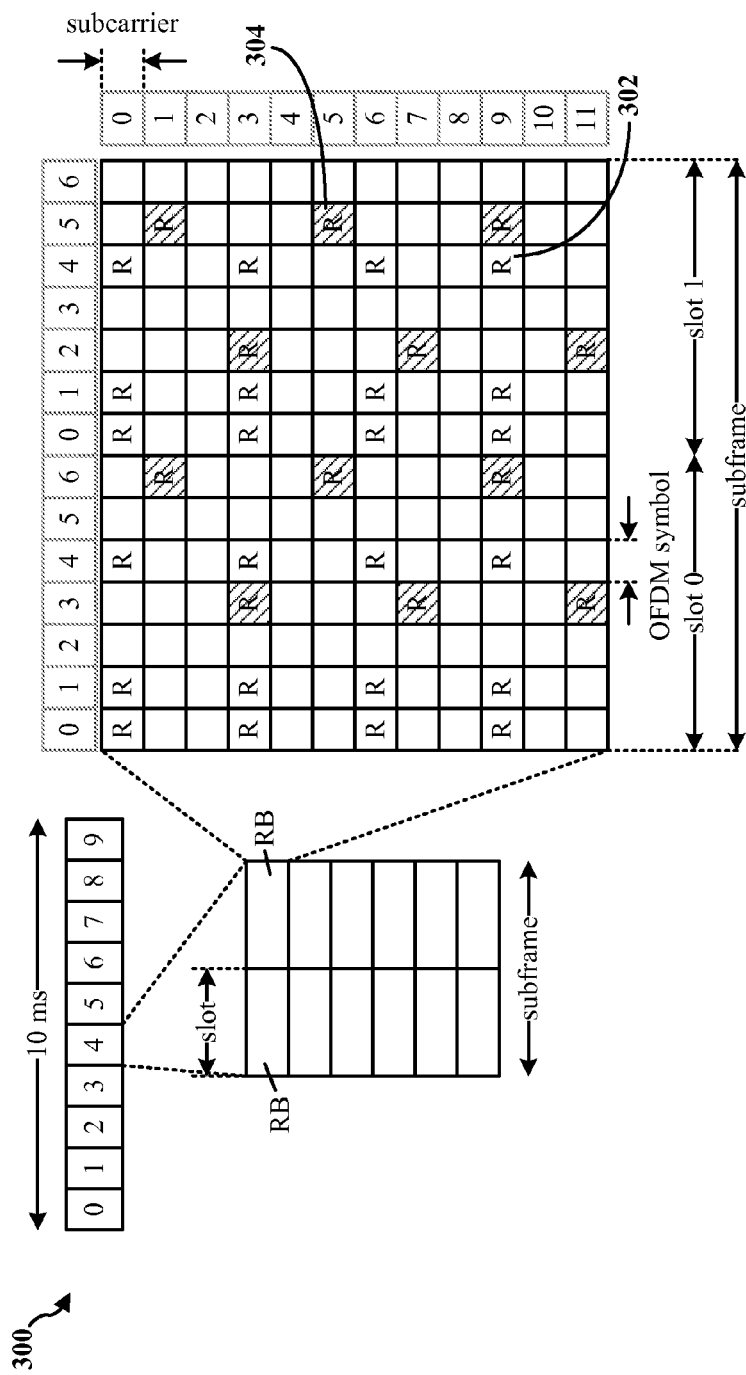
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
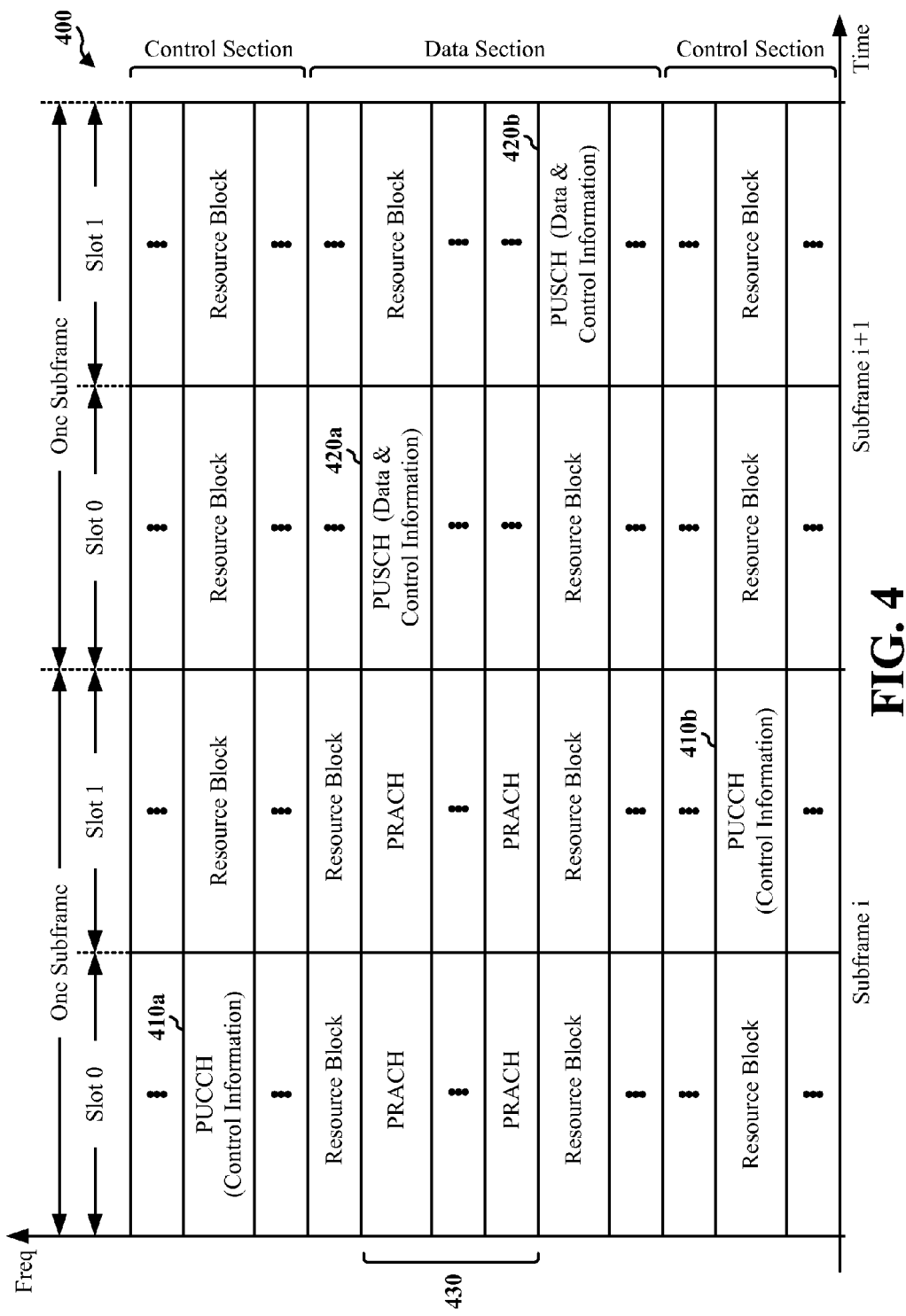
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
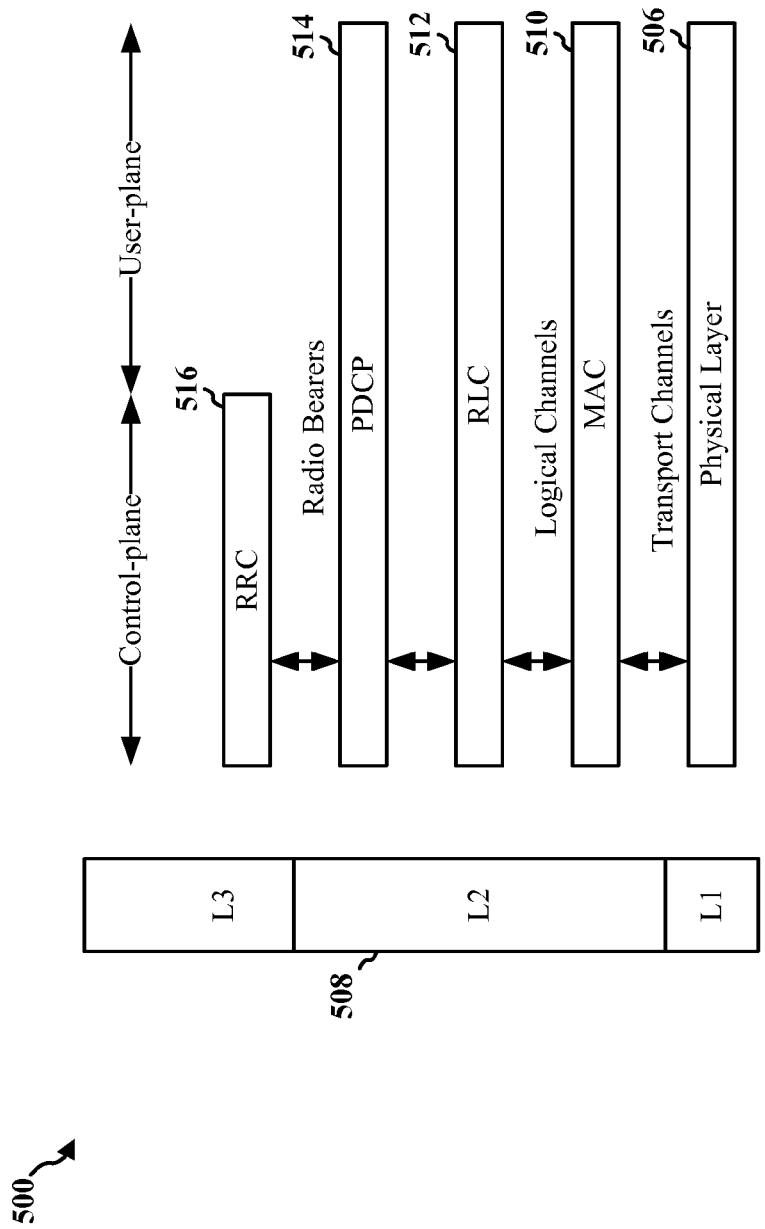
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
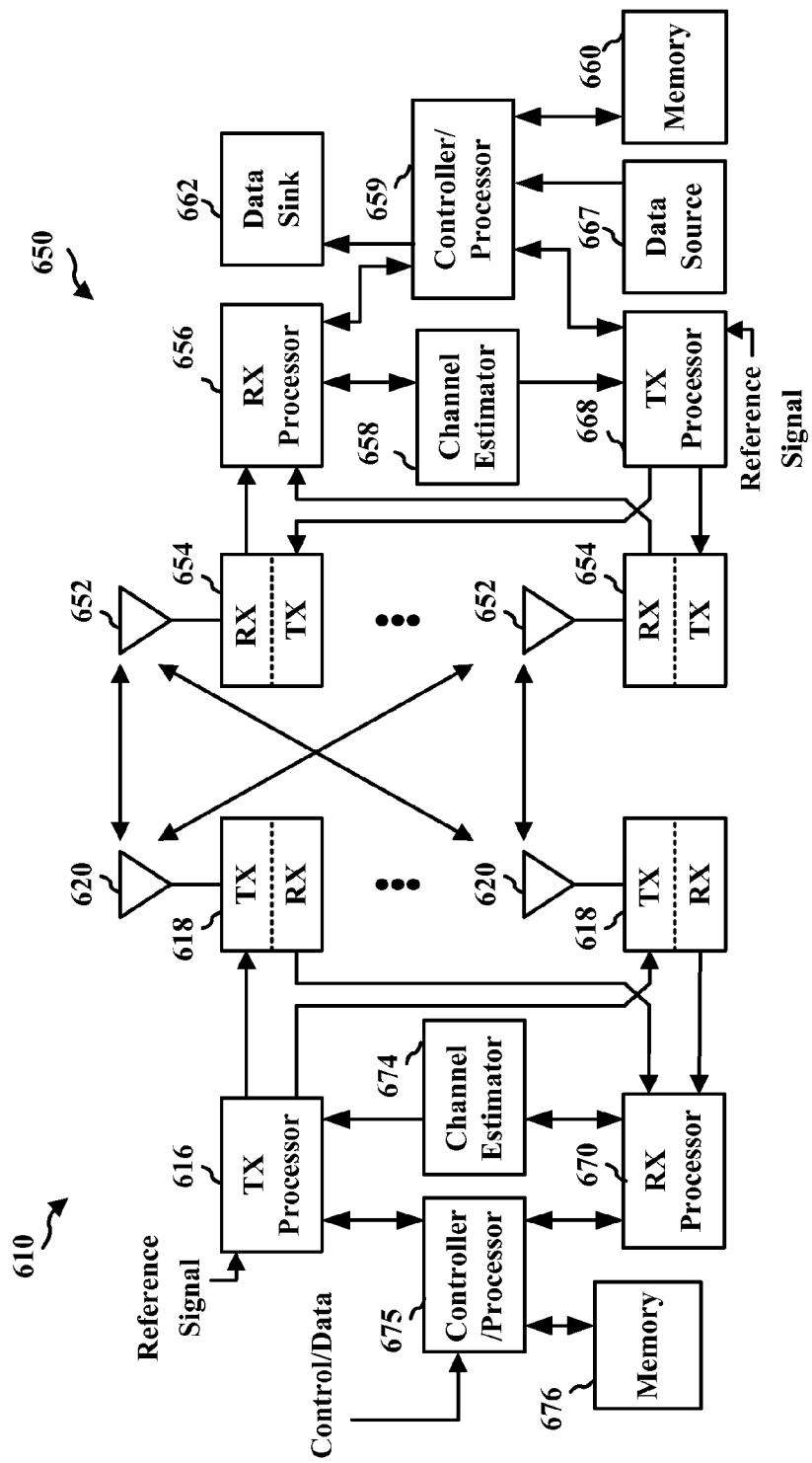
FIG. 6 is a diagram illustrating an example of an evolved Node B and user equipment in an access network.

FIG. 6 is a block diagram of a base station 610 in communication with a UE 650 in an access network. The base station 610 may be an eNB or an mmW base station. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 610. These soft decisions may be based on channel estimates computed by the channel estimator 658. The soft decisions are then decoded and deinterleaved to recover the data and control signals that were originally transmitted by the base station 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the base station 610, the controller/processor 659 implements the L2 layer for the user plane and the control plane by providing header compression, ciphering, packet segmentation and reordering, and multiplexing between logical and transport channels based on radio resource allocations by the base station 610. The controller/processor 659 is also responsible for HARQ operations, retransmission of lost packets, and signaling to the base station 610.

Channel estimates derived by a channel estimator 658 from a reference signal or feedback transmitted by the base station 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the base station 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

If the base station 610 is an mmW base station, the base station 610 may include hardware for performing beamforming. Further, the UE 650 may include hardware for performing beamforming.

Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave (mmW). Near mmW may extend down to a frequency of 3 GHz with a wavelength of 100 millimeters (the super high frequency (SHF) band extends between 3 GHz and 30 GHz, also referred to as centimeter wave). While the disclosure herein references mmWs, it should be understood that the disclosure also applies to near mmWs. Further, while the disclosure herein refers to mmW base stations, it should be understood that the disclosure also applies to near mmW base stations. The millimeter wavelength RF channel has extremely high path loss and a short range. In order to build a useful communication network in the millimeter wavelength spectrum, a beamforming technique may be used to compensate for the extreme high path loss. The beamforming technique focuses the RF energy into a narrow direction to allow the RF beam to propagate farther in that direction. Using the beamforming technique, non-line of sight (NLOS) RF communication in the millimeter wavelength spectrum may rely on reflection and/or diffraction of the beams to reach the UE. If the direction becomes blocked, either because of the UE movement or changes in the environment (e.g., obstacles, humidity, rain, etc.), the beam may not be able to reach the UE. Thus, in order to ensure that the UE has continuous, seamless coverage, multiple beams in as many different directions as possible may be available.

In order to provide a continuous and seamless coverage, each of several mmW base stations in the vicinity of the UE may measure a channel between the UE and the base station, and find the best beam directions the base station can transmit to reach the UE. In addition, each of the base stations may coordinate with other mmW base stations to determine which mmW base station has the best beam direction. Further, each of the base stations may plan for a secondary beam in case of a sudden change that can cause severe attenuation of the best beam.

For each UE, mmW base stations in the vicinity of the UE may form an active set for that UE. An anchor node for the active set may be chosen to coordinate the mmW base stations in the active set. The anchor node is a base station and may or may not be an mmW base station. The anchor node may choose a particular direction from a particular mmW base station in the active set to serve the UE. If the beam in that particular direction from that particular base station becomes blocked (or severely attenuated), the anchor node may choose another beam to keep the UE covered. The active set may evolve or adapt based on the mobility of the UE. The anchor node may add and/or remove mmW base stations to and from the active set as the UE moves closer to some mmW base stations and farther from other mmW base stations. In addition, the active set may allow the anchor node to coordinate the mmW base stations to perform handoffs. The active set may search for and keep track of beams from multiple base stations that can cover the UE. Coordination may be performed among the nodes in the active set to select the best beam, to change the beam in case of sudden severe attenuation, to perform handoffs, etc.

Beamforming techniques and methods for providing seamless and continuous coverage for a mobile UE in continuously changing wireless environments is provided infra.

Figure 7:
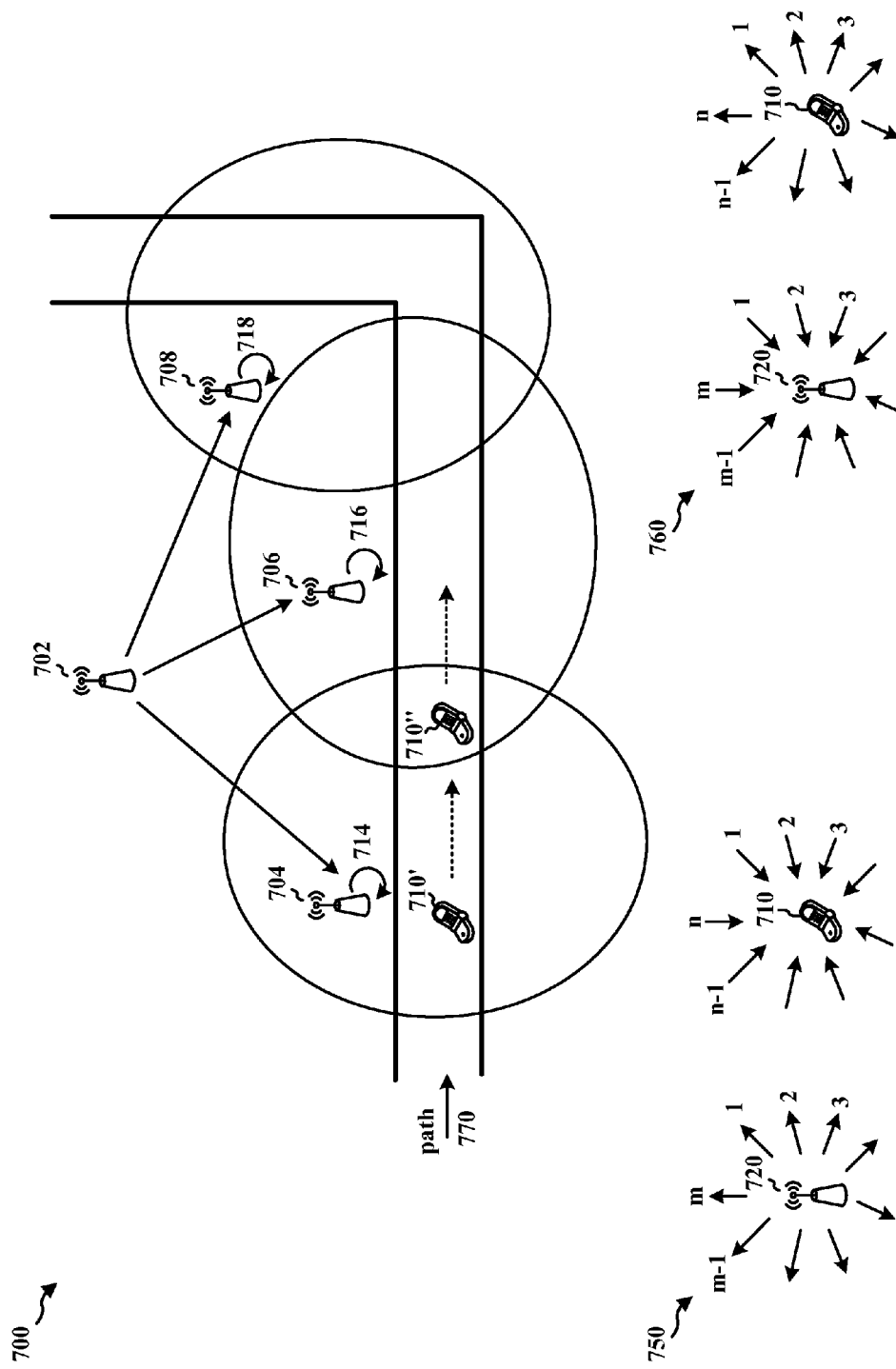
FIG. 7 is a diagram for illustrating exemplary methods associated with channel enhancement in millimeter wavelength wireless access networks.

FIG. 7 is a diagram 700 for illustrating exemplary methods associated with channel enhancement in millimeter wavelength wireless access networks. Referring to FIG. 7, the UE 710 performs beam sweeps with mmW base stations within range. The beam sweeps may be performed as illustrated in diagram 750 and/or diagram 760. Referring to the diagram 750, in a beam sweep, the mmW base station 720 transmits m beams in a plurality of different spatial directions. The UE 710 listens/scans for the beam transmissions from the mmW base station 720 in n different receive spatial directions. When listening/scanning for the beam transmissions, the UE 710 may listen/scan for the beam sweep transmission from mmW base station 720 m times in each of the n different receive spatial directions (a total of m*n scans). Referring to the diagram 760, in a beam sweep, the UE 710 transmits n beams in a plurality of different spatial directions. The mmW base station 720 listens/scans for the beam transmissions from the UE 710 in m different receive spatial directions. When listening/scanning for the beam transmissions, the mmW base station 720 may listen/scan for the beam sweep transmission from the UE 710 n times in each of the m different receive spatial directions (a total of m*n scans).

Based on the performed beam sweeps, the UEs and/or the mmW base stations determine a channel quality associated with the performed beam sweeps. For example, if the beam sweep process in diagram 750 is performed, the UE 710 may determine the channel quality associated with the performed beam sweeps. However, if the beam sweep process in the diagram 760 is performed, the mmW base station 720 may determine the channel quality associated with the performed beam sweeps. If the UE 710 determines a channel quality associated with the performed beam sweeps, the UE 710 sends the channel quality information (also referred to as beam sweep result information) to an anchor node 702. The anchor node 702 may or may not be an mmW base station. The UE 710 may send the beam sweep result information directly to the anchor node 702 if the anchor node 702 is in range, or may send the beam sweep result information to a serving mmW base station, which forwards the beam sweep result information to the anchor node 702. If the mmW base station 720 determines a channel quality associated with the performed beam sweeps, the mmW base station 720 sends the beam sweep result information to the anchor node 702.

The anchor node 702 receives channel quality information in the beam sweep result information from the mmW base stations 704, 706, and 708. Based on the beam sweep result information from the mmW base stations 704, 706, and 708, the anchor node 702 may command one or more of the mmW base stations 704, 706, and 708 to adjust (714, 716, 718) a periodicity in which the mmW base stations perform a beam sweep with the UE 710 (710' and 710"). With a greater beam sweep periodicity, UE transmit/receive spatial directions and mmW base station transmit/receive spatial directions can be quickly adjusted for improving the communication between the UE and the mmW base station. With a lower beam sweep periodicity, the UE and the mmW base station save power by expending less power on beam sweeps, but at the expense that communication between the UE and the mmW base station may be subject to a greater attenuation as a result of being more likely to use transmit/receive spatial directions that are less desirable.

With respect to FIG. 7, the anchor node 702 receives channel quality information associated with a beam sweep between the mmW base station 704 and the UE 710'. If the anchor node 702 determines that the channel quality for the UE 710' and the mmW base station 704 is less than a first threshold quality, the anchor node 702 may command the mmW base station 704 to increase the periodicity in which the mmW base station 704 performs a beam sweep with the UE 710'. If the anchor node 702 determines that the channel quality for the UE 710' and the mmW base station 704 is greater than the first threshold quality, but less than a second threshold quality, the anchor node 702 may not request the mmW base station 704 to adjust the periodicity in which the mmW base station 704 performs a beam sweep with the UE 710'. However, if the anchor node 702 determines that the channel quality for the UE 710' and the mmW base station 704 is greater than the second threshold quality, the anchor node 702 may command the mmW base station 704 to decrease the periodicity in which the mmW base station 704 performs a beam sweep with the UE 710'. The first threshold quality may be a channel quality below which coverage may not be seamless and continuous. The second threshold quality, which is greater than the first threshold quality, may be a channel quality above which seamless and continuous coverage may not be significantly improved.

The anchor node 702 may determine a channel variability of the channel between the UE 710' and the mmW base station 704 based on the received channel quality information. The channel variability is how quickly the channel is varying between the UE 710' and the mmW base station 704. The channel between the UE 710' and the mmW base station 704 may vary quickly based on movement of the UE 710' along or in the path 770. The movement may be due to rotation of the UE, such as by a user holding and rotating the UE in the user's hand (which changes the best UE transmit/receive spatial directions), or movement along the path behind obstacles or within particular environmental conditions (e.g., rain, humidity) that cause the channel quality to vary quickly. Based on the channel variability, the anchor node 702 may adjust the periodicity of the beam sweeps performed between the mmW base station 704 and the UE 710'. For example, if the channel quality is less than a first threshold quality and the channel variability is greater than a first threshold variability, the anchor node 702 may request the mmW base station 704 to increase the periodicity in which the mmW base station 704 performs beam sweeps with the UE 710'. For another example, if the channel quality is greater than a second threshold quality and the channel variability is less than a second threshold variability, the anchor node 702 may request the mmW base station 704 to decrease the periodicity in which the mmW base station 704 performs beam sweeps with the UE 710'. The second threshold quality is greater than the first threshold quality, and the second threshold variability is less than the first threshold variability.

As the UE 710' travels along the path 770, the UE (now referred to as UE 710") moves into an overlapping coverage region between the mmW base station 704 and the mmW base station 706. Based on the beam sweep result information, the anchor node 702 may determine if and when the UE 710" should be handed over from the mmW base station 704 to the mmW base station 706. When a handover is expected, the anchor node 702 may command all mmW base stations that can potentially participate in the handoff and the UE 710" to increase or to decrease the periodicity of the beam sweep.

Accordingly, the anchor node 702 may determine based on the received channel quality information that the UE 710" needs to be handed off from the mmW base station 704 to the mmW base station 706. To facilitate the handoff, the anchor node 702 may command the mmW base station 704 and/or the mmW base station 706 to increase a periodicity of performing the beam sweep with the UE 710". The anchor node 702 may command the mmW base station 704 to increase a periodicity of performing the beam sweep with the UE 710" so that the UE 710" does not suffer a radio link failure with the mmW base station 704 before the UE 710" is handed off to the mmW base station 706. The anchor node 702 may command the mmW base station 706 to increase a periodicity of performing the beam sweep with the UE 710" to improve the likelihood that the handoff is successful to the mmW base station 706.

The anchor node 702 may collect and save the measurement data from the beam sweep result information for use in predicting future handoffs. The anchor node 702 may also collect and save information associated with movement of UEs along the path 770 in order to predict when a handoff will be likely (i.e., future handoffs). As such, the anchor node 702 may determine whether the UE 710" should be handed off from the mmW base station 704 to the mmW base station 706 based on knowledge of previous handoffs of UEs from the mmW base station 704 to the mmW base station 706. Further, the anchor node 702 may predict when another handoff to the mmW base station 708 is likely based on an analysis of the history of past handoff events and/or the direction of the path 770 within coverage of the mmW base stations. After the UE 710" is successfully handed off from the mmW base station 704 to the mmW base station

706, the anchor node 702 may command the mmW base stations 704 and 706 to decrease the periodicity in which the beam sweep is performed. After the handoff, the anchor node 702 may forward all data destined for the UE 710" to the mmW base station 706. Accordingly, the anchor node 702 will forward data packets for the UE 710" to the mmW base station 704 before the UE 710" is handed off to the mmW base station 706, and will forward data packets for the UE 710" to the mmW base station 706 after the UE 710" is handed off from the mmW base station 704 to the mmW base station 706.

Figure 8:
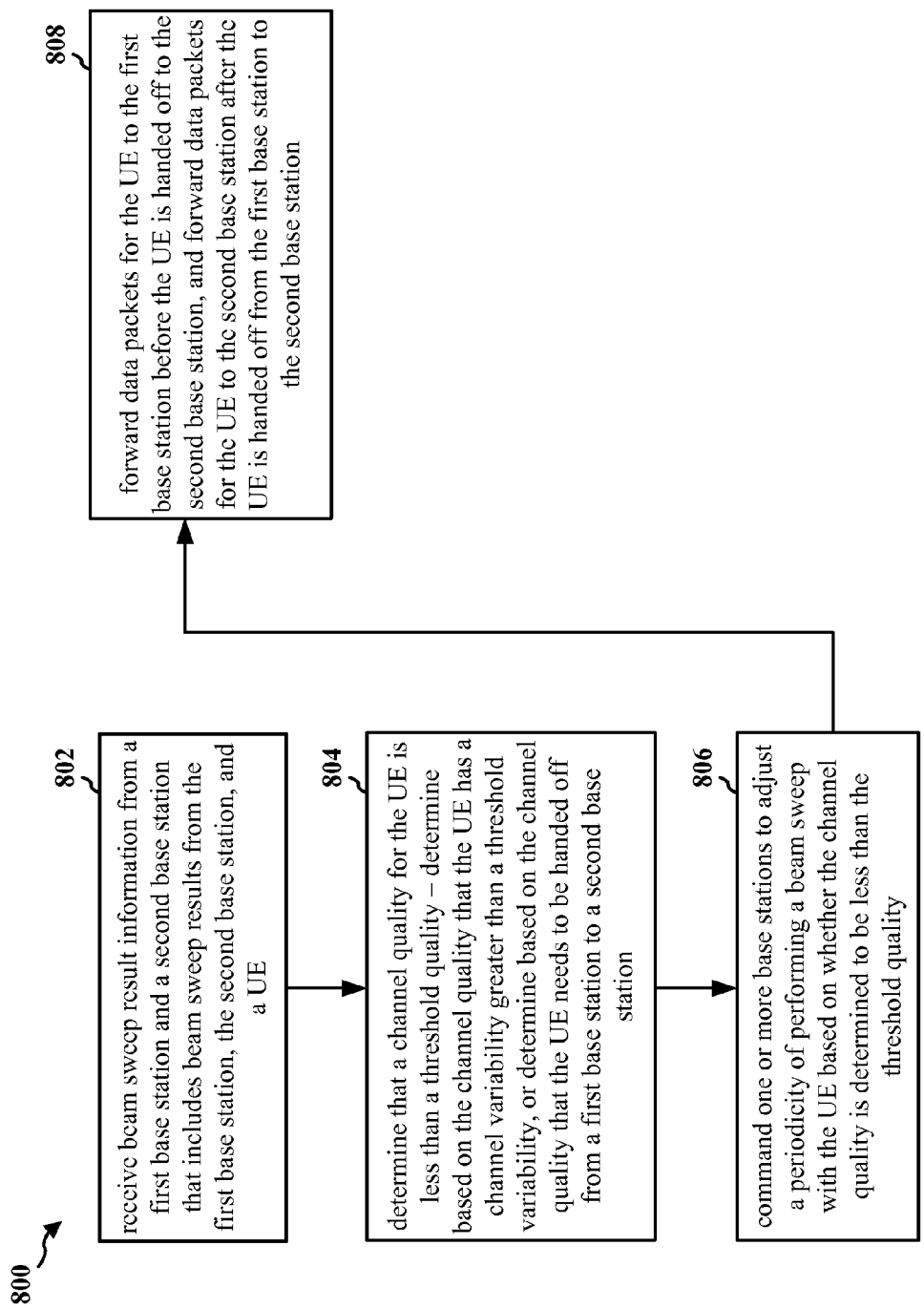
FIG. 8 is a flow chart of a first method of wireless communication.

FIG. 8 is a flow chart 800 of a first method of wireless communication. The method may be performed by a base station that is an anchor node, such as the anchor node 702. At step 802, the base station receives beam sweep result information from a first base station and a second base station that includes beam sweep results from the first base station, the second base station, and a UE. As discussed supra, the beam sweep is a plurality of transmissions of a beam in a plurality of different transmit spatial directions by one of a base station or the UE and a plurality of scans of the beam in a plurality of different scan spatial directions by an other of the one of the base station or the UE. For example, referring to FIG. 7, the anchor node 702 may receive beam sweep result information from the mmW base station 704 and the mmW base station 706 that includes beam sweep results from the mmW base station 704, the mmW base station 706, and the UE 710 (710'/710"). The beam sweep may be performed as indicated in the diagram 750 or the diagram 760.

At step 804, based on the received beam sweep result information from step 802, the base station determines that a channel quality for a UE is less than a threshold quality. For example, referring to FIG. 7, the anchor node 702 may determine that the channel quality for the UE 710 (710'/710") is less than a threshold quality.

At step 804, the base station may determine based on the channel quality that the UE has a channel variability greater than a threshold variability. In such a situation, because the channel quality is less than a threshold quality and the channel variability is greater than a threshold variability, the base station may command a base station serving the UE to increase a periodicity of performing the beam sweep. For example, referring to FIG. 7, the anchor node 702 may determine based on the channel quality that the UE 710' has a channel quality less than a threshold quality and a channel variability greater than a threshold variability. In such a situation, the anchor node 702 may command the mmW base station 704 serving the UE 710' to increase a periodicity of performing the beam sweep. Specifically, the anchor node 702 may command the mmW base station 704 serving the UE 710' to increase a periodicity of performing the beam sweep when the UE 710' is determined to have a channel quality less than a first threshold quality and a channel variability greater than a first threshold variability. In addition, the anchor node 702 may command the mmW base station 704 serving the UE 710' to decrease a periodicity of performing the beam sweep when the UE 710' is determined to have a channel quality greater than a second threshold quality and a channel variability less than a second threshold variability. The first threshold quality is less than the second threshold quality, and the second threshold variability is less than the first threshold variability.

At step 804, the base station may determine based on the channel quality that the UE needs to be handed off from a first base station to a second base station. The handoff determination may also be based on knowledge of previous handoffs of UEs from the first base station to the second base station. In such a situation, the base station commands at least one of the first base station or the second base station to increase a periodicity of performing the beam sweep with the UE to facilitate the handoff of the UE from the first base station to the second base station. For example, referring to FIG. 7, the anchor node 702 may determine based on the channel quality that the UE 710" needs to be handed off from the mmW base station 704 to the mmW base station 706. In such a situation, the base station commands at least one of the mmW base station 704 or the mmW base station 706 to increase a periodicity of performing the beam sweep with the UE 710" to facilitate the handoff of the UE 710" from the mmW base station 704 to the mmW base station 706.

At step 806, the base station commands one or more base stations to adjust a periodicity of performing a beam sweep with the UE based on whether the channel quality is determined to be less than the threshold quality. For example, referring to FIG. 7, the anchor node 702 may command the mmW base station 704 and/or the mmW base station 706 to adjust a periodicity of performing a beam sweep with the UE 710'/710" based on whether the channel quality is determined to be less than the threshold quality. The base station may command the at least one of the first base station or the second base station to increase the periodicity of performing the beam sweep before the second base station receives the UE in the handoff from the first base station. The base station may command the at least one of the first base station or the second base station to decrease the periodicity of performing the beam sweep after the second base station receives the UE successfully from the first base station in the handoff.

At step 808, the base station forwards data packets for the UE to the first base station before the UE is handed off to the second base station, and forwards data packets for the UE to the second base station after the UE is handed off from the first base station to the second base station.

Figure 9:
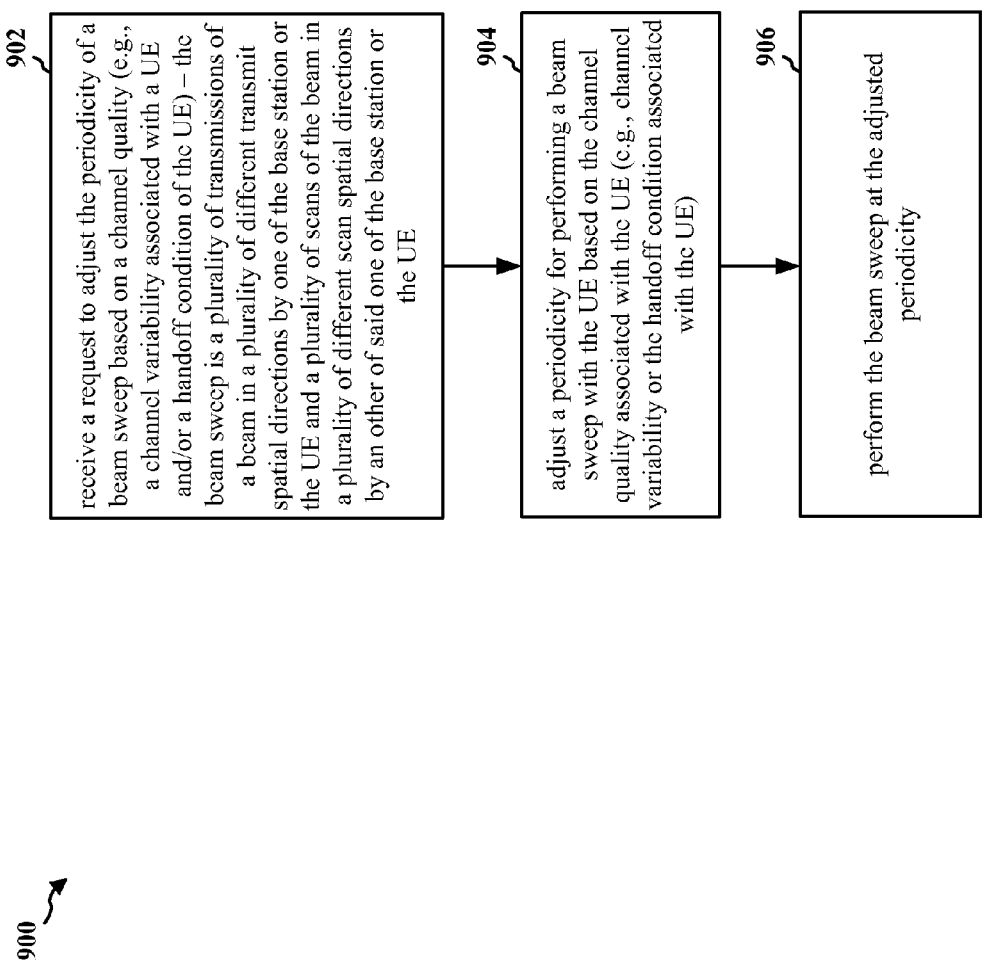
FIG. 9 is a flow chart of a second method of wireless communication.

FIG. 9 is a flow chart 900 of a second method of wireless communication. The method may be performed by a base station, such as the mmW base stations 704 and 706. At step 902, the base station receives a request to adjust the periodicity of the beam sweep based on a channel quality of a UE. The request to adjust the periodicity may be further based on a channel variability of a channel between the UE and an mmW base station and/or a handoff condition of the UE. The beam sweep is a plurality of transmissions of a beam in a plurality of different transmit spatial directions by one of the base station or the UE and a plurality of scans of the beam in a plurality of different scan spatial directions by an other of the one of the base station or the UE (see diagrams 750/760 of FIG. 7). At step 904, the base station adjusts a periodicity for performing a beam sweep with the UE based on the channel quality associated with the UE. The base station may adjust the periodicity of performing the beam sweep with the UE further based on the channel variability and/or the handoff condition of the UE. At step 906, the base station performs the beam sweep at the adjusted periodicity.

When the request to adjust the beam sweep periodicity is based on a channel quality and a channel variability associated with the UE, the base station may increase the periodicity of performing the beam sweep when the channel quality is less than a threshold quality and the channel variability is greater than a variability threshold, and decrease the periodicity of performing the beam sweep when the channel quality is greater than a second threshold quality and the channel variability is less than a second variability threshold.

When the request to adjust the beam sweep periodicity is based on a channel quality and a handoff condition of the UE, the base station may increase the periodicity of performing the beam sweep when the base station is handing off the UE to a second base station or is receiving the UE in a handoff from the second base station, and decrease the periodicity of performing the beam sweep when the UE is successfully handed off to the second base station or is successfully received in a handoff from the second base station.

Figure 10:
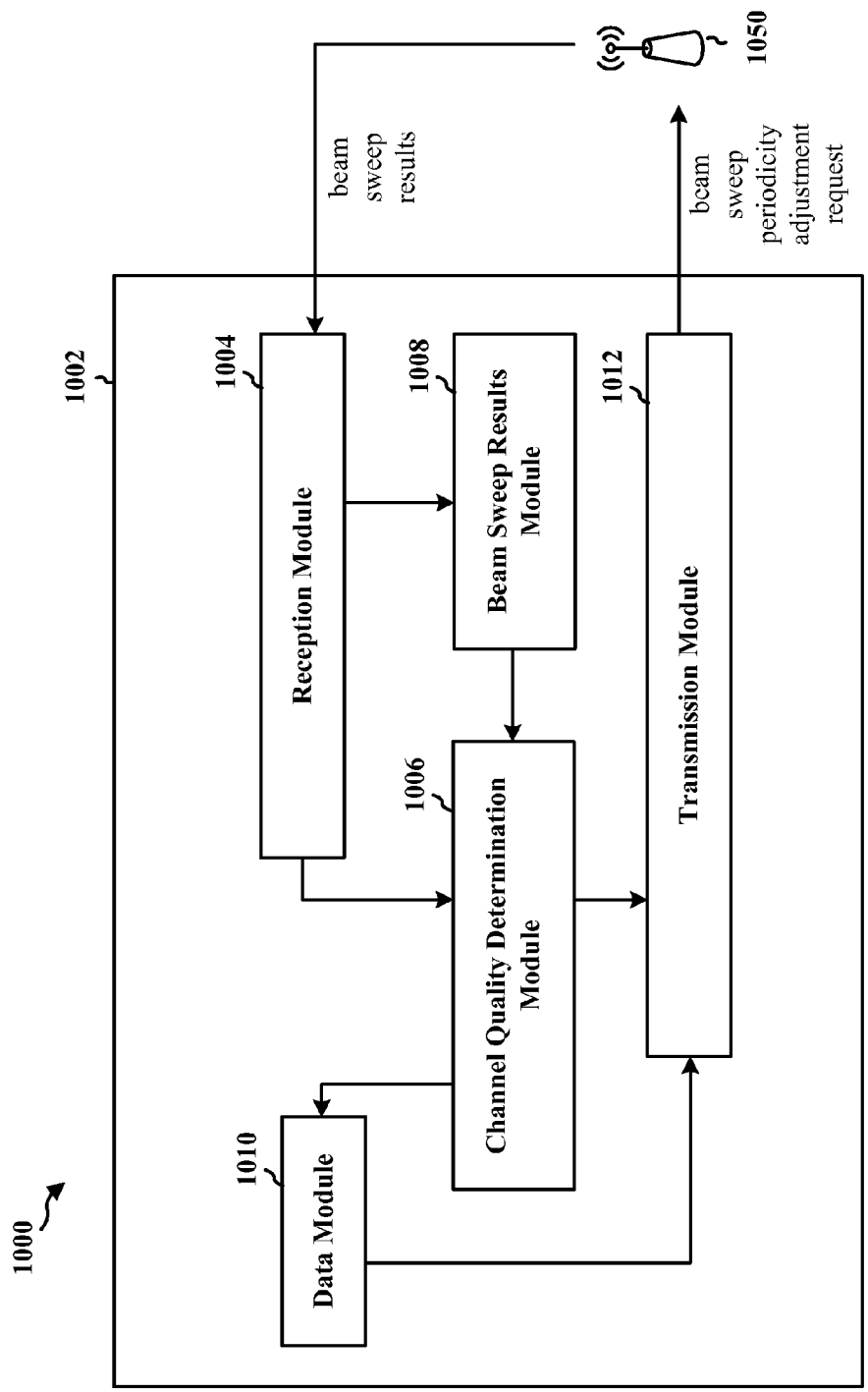
FIG. 10 is a data flow diagram illustrating the data flow between different modules/means/components in a first exemplary apparatus.

FIG. 10 is a data flow diagram 1000 illustrating the data flow between different modules/means/components in a first exemplary apparatus 1002. The apparatus includes a channel quality determination module 1006. The channel quality determination module 1006 may be configured to determine a channel quality associated with a channel between a UE and an mmW base station, and may be further configured to determine a channel variability associated with such a channel and/or a handoff condition of the UE. The channel quality determination module 1006 is configured to determine whether a channel quality for a UE is less than a threshold quality. The channel quality determination module 1006 may communicate with a transmission module 1012 in order to command one or more base stations to adjust a periodicity of performing a beam sweep with the UE based on whether the channel quality is determined to be less than the threshold quality.

The channel quality determination module 1006 may be configured to determine based on the channel quality that the UE has a channel variability greater than a threshold variability. The transmission module 1012 may be configured to command the base station 1050 serving the UE to increase a periodicity of performing the beam sweep when the UE is determined to have a channel variability greater than the threshold variability. The channel quality determination module 1006 may be configured to determine based on the channel quality that the UE needs to be handed off from a first base station to a second base station. The transmission module 1012 may be configured to command at least one of the first base station or the second base station to increase a periodicity of performing the beam sweep with the UE to facilitate the handoff of the UE from the first base station to the second base station. The apparatus may further include a reception module 1004 that is configured to receive beam sweep result information from the first base station and the second base station that includes beam sweep results from the first base station, the second base station, and the UE. The reception module 1004 may be configured to provide the received beam sweep result information to a beam sweep results module 1008. When making the handoff determination, the channel quality determination module 1006, with communication with the beam sweep results module 1008, may be configured to make the determination based on the received beam result information. The channel quality determination module 1006 may be configured to make the handoff determination of the UE further based on knowledge of previous handoffs of UEs from the first base station to the second base station. When commanding the at least one of the first base station or the second base station, the transmission module 1012 may be configured to command the at least one of the first base station or the second base station to increase the periodicity of performing the beam sweep before the second base station receives the UE in the handoff from the first base station. When commanding the at least one of the first base station or the second base station, the transmission module 1012 may be configured to command the at least one of the first base station or the second base station to decrease the periodicity of performing the beam sweep after the second base station receives the UE successfully from the first base station in the handoff. The apparatus may include a data module 1010 that is configured to provide data packets to the transmission module 1012. The transmission module 1012 may be configured to forward the received data packets for the UE to the first base station before the UE is handed off to the second base station, and to forward the received data packets for the UE to the second base station after the UE is handed off from the first base station to the second base station.

The apparatus may include additional modules that perform each of the steps of the algorithm in the aforementioned flow charts of FIG. 8. As such, each step in the aforementioned flow chart of FIG. 8 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 11:
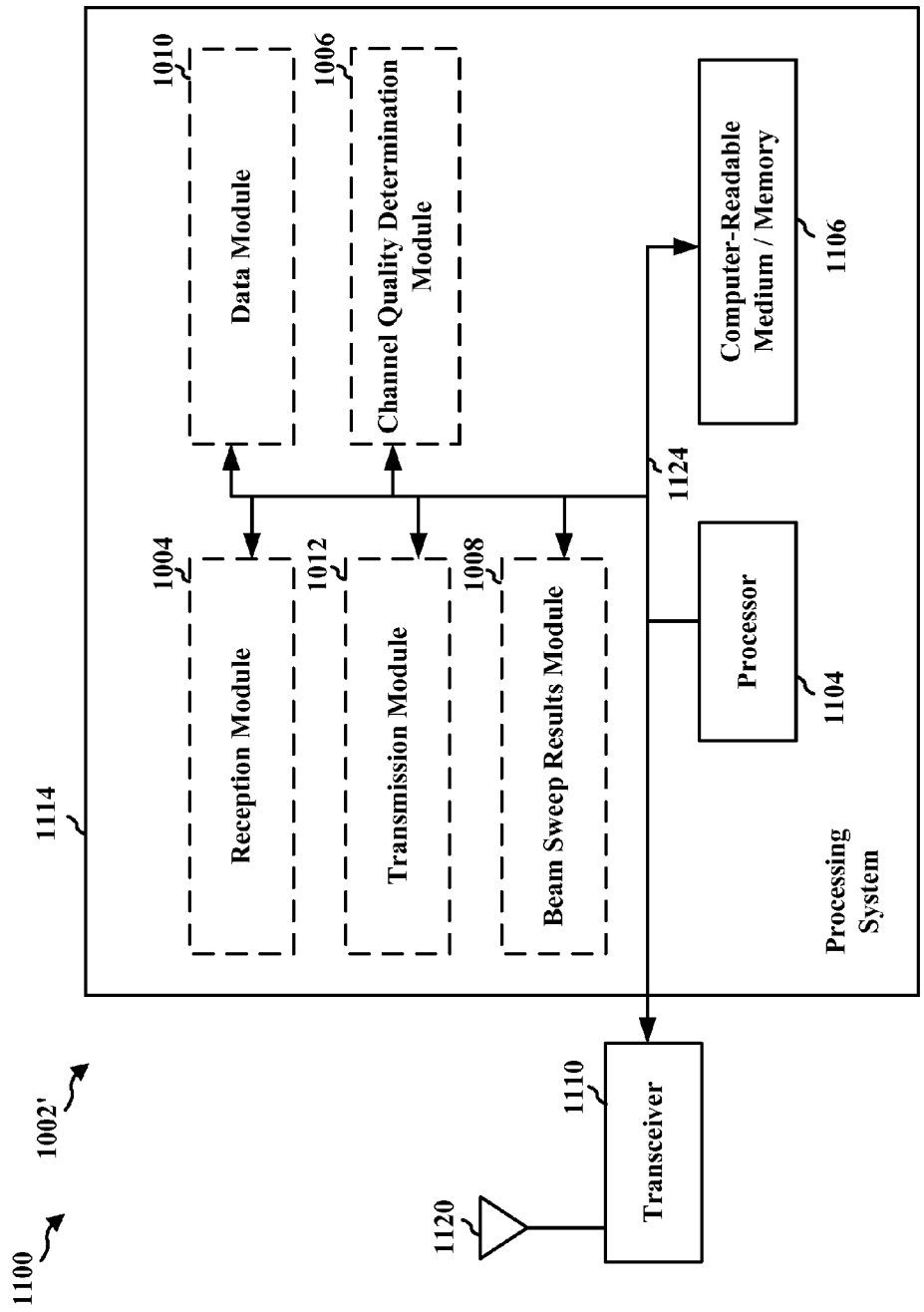
FIG. 11 is a diagram illustrating an example of a hardware implementation for a first apparatus employing a processing system.

FIG. 11 is a diagram 1100 illustrating an example of a hardware implementation for a first apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware modules, represented by the processor 1104, the modules 1004, 1006, 1008, 1010, and 1012 and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114. In addition, the transceiver 1110 receives information from the processing system 1114, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system further includes at least one of the modules 1004, 1006, 1008, 1010, and 1012. The modules may be software modules running in the processor 1104, resident/stored in the computer readable medium/memory 1106, one or more hardware modules coupled to the processor 1104, or some combination thereof. The processing system 1114 may be a component of the mmW base station 720.

In one configuration, the apparatus 1002/1002' for wireless communication includes means for determining that a channel quality for a UE is less than a threshold quality, and means for commanding one or more base stations to adjust a periodicity of performing a beam sweep with the UE based on whether said channel quality is determined to be less than the threshold quality. The apparatus may further include means for determining based on said channel quality that the UE has a channel variability greater than a threshold variability. The means for commanding may be configured to command a base station serving the UE to increase a periodicity of performing the beam sweep when the UE is determined to have a channel variability greater than the threshold variability. The apparatus may further include means for determining based on said channel quality that the UE needs to be handed off from a first base station to a second base station. The means for commanding may be configured to command at least one of the first base station or the second base station to increase a periodicity of performing the beam sweep with the UE to facilitate the handoff of the UE from the first base station to the second base station. The apparatus may further include means for receiving beam sweep result information from the first base station and the second base station that includes beam sweep results from the first base station, the second base station, and the UE. The handoff determination may be based on the received beam result information. The handoff determination of the UE may be further based on knowledge of previous handoffs of UEs from the first base station to the second base station. The means for commanding the at least one of the first base station or the second base station may be configured to command the at least one of the first base station or the second base station to increase the periodicity of performing the beam sweep before the second base station receives the UE in the handoff from the first base station. The means for commanding the at least one of the first base station or the second base station may be configured to command the at least one of the first base station or the second base station to decrease the periodicity of performing the beam sweep after the second base station receives the UE successfully from the first base station in the handoff. The apparatus may further include means for forwarding data packets for the UE to the first base station before the UE is handed off to the second base station, and means for forwarding data packets for the UE to the second base station after the UE is handed off from the first base station to the second base station.

The aforementioned means may be one or more of the aforementioned modules of the apparatus 1002 and/or the processing system 1114 of the apparatus 1002' configured to perform the functions recited by the aforementioned means.

Figure 12:
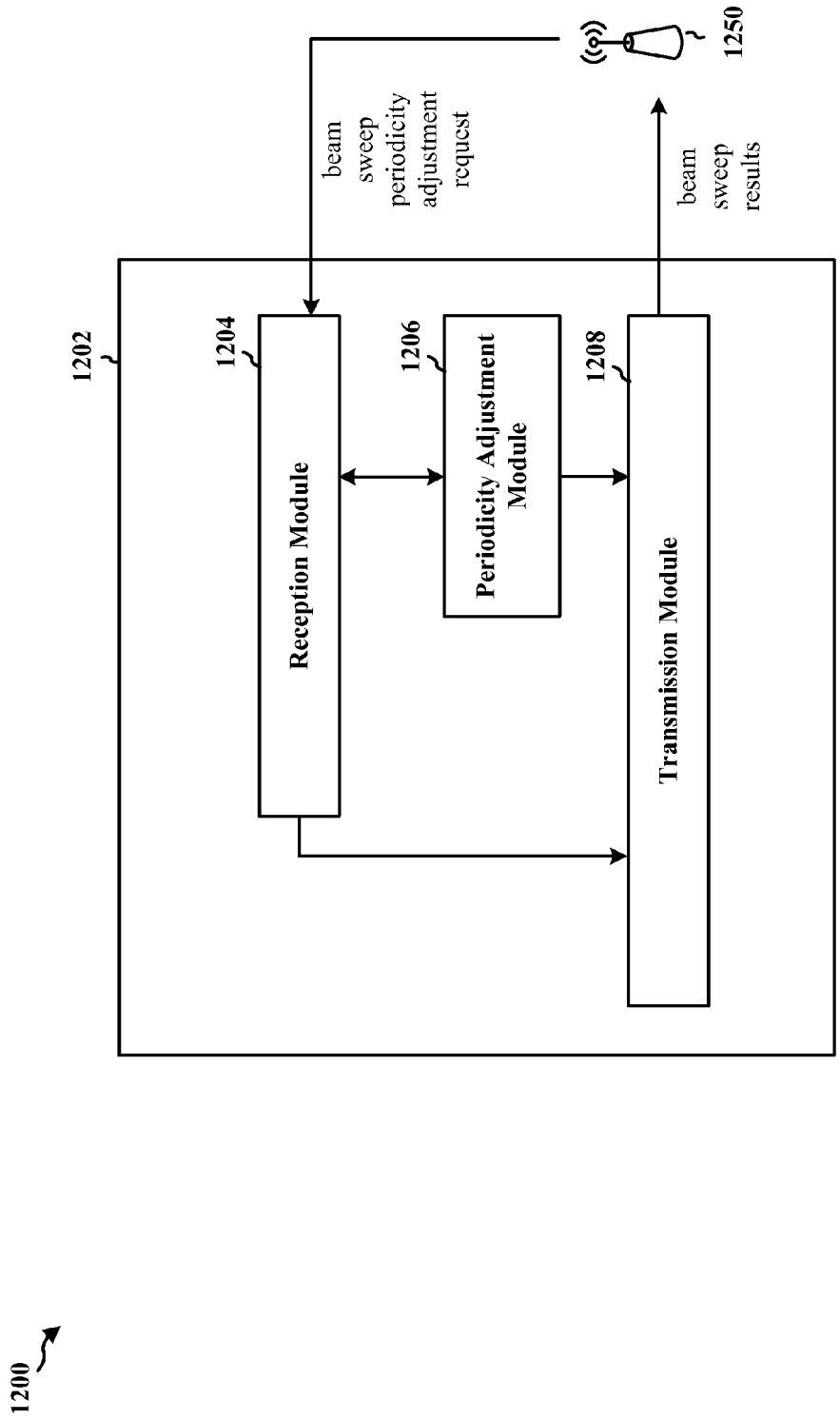
FIG. 12 is a data flow diagram illustrating the data flow between different modules/means/components in a second exemplary apparatus.

FIG. 12 is a data flow diagram 1200 illustrating the data flow between different modules/means/components in a second exemplary apparatus 1202. The apparatus includes a periodicity adjustment module 1206 that is configured to adjust a periodicity for performing a beam sweep with a UE based on a channel quality associated with the UE. The beam sweep is a plurality of transmissions of a beam in a plurality of different transmit spatial directions by one of the base station or the UE and a plurality of scans of the beam in a plurality of different scan spatial directions by an other of the one of the base station or the UE. The apparatus further includes a reception module 1204 and a transmission module 1208 that is configured to perform the beam sweep at the adjusted periodicity. The reception module 1204 may be configured to receive a request from an anchor node 1250 to adjust the periodicity based on the channel quality and a channel variability associated with the UE. The periodicity adjustment module 1206 may be configured to increase the periodicity of performing the beam sweep when the channel quality is less than a threshold quality and the channel variability is greater than a variability threshold, and to decrease the periodicity of performing the beam sweep when the channel quality is greater than a second threshold quality and the channel variability is less than a second variability threshold. The reception module 1204 may be configured to receive a request from an anchor node 1250 to adjust the periodicity based on the channel quality and a handoff condition of the UE. The periodicity adjustment module 1206 may be configured to increase the periodicity of performing the beam sweep when the base station is handing off the UE to a second base station or is receiving the UE in a handoff from the second base station, and to decrease the periodicity of performing the beam sweep when the UE is successfully handed off to the second base station or is successfully received in a handoff from the second base station.

The apparatus may include additional modules that perform each of the steps of the algorithm in the aforementioned flow charts of FIG. 9. As such, each step in the aforementioned flow chart of FIG. 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 13:
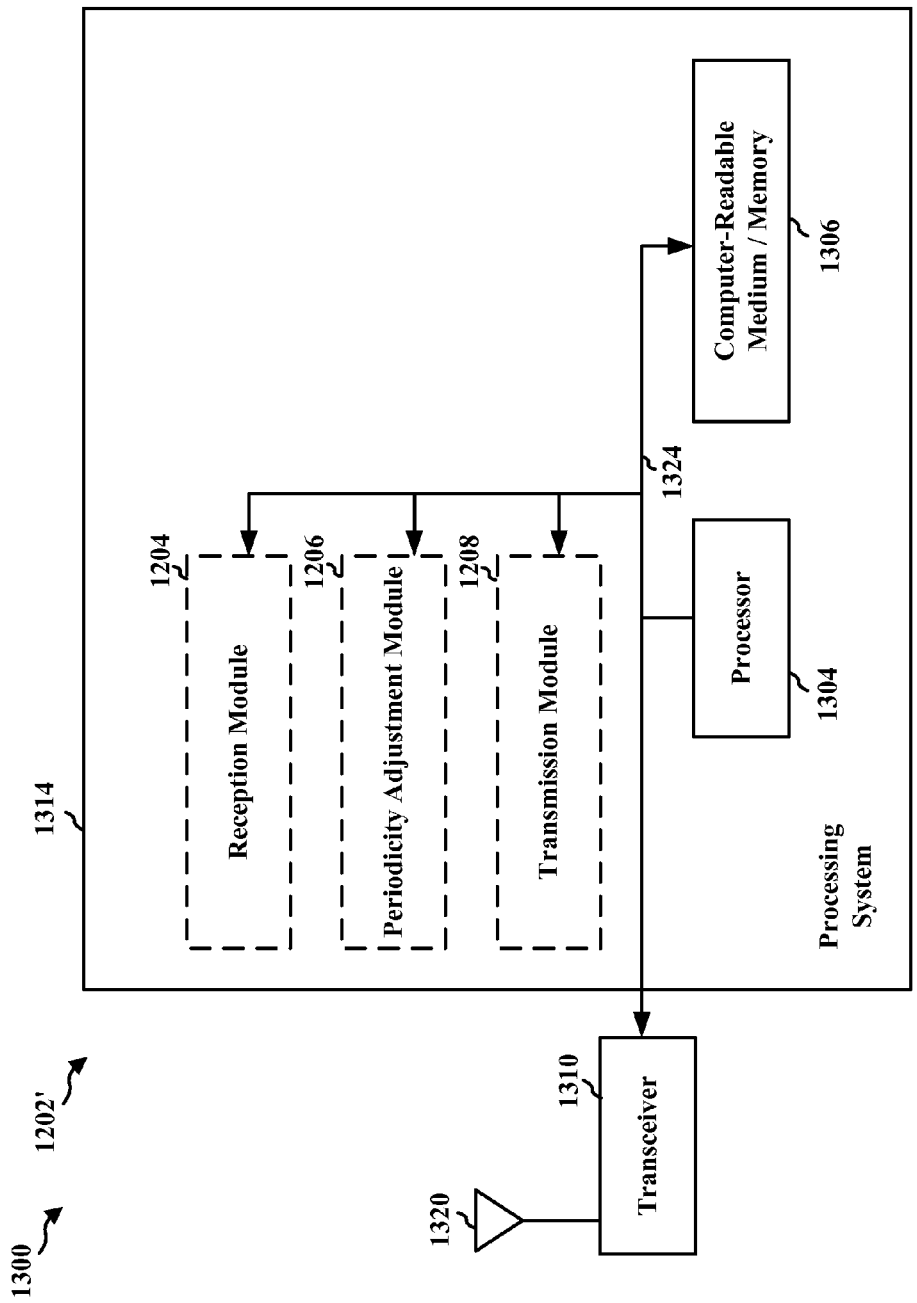
FIG. 13 is a diagram illustrating an example of a hardware implementation for a second apparatus employing a processing system.

FIG. 13 is a diagram 1300 illustrating an example of a hardware implementation for a second apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware modules, represented by the processor 1304, the modules 1204, 1206, and 1208 and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314. In addition, the transceiver 1310 receives information from the processing system 1314, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system further includes at least one of the modules 1204, 1206, and 1208. The modules may be software modules running in the processor 1304, resident/stored in the computer readable medium/memory 1306, one or more hardware modules coupled to the processor 1304, or some combination thereof. The processing system 1314 may be a component of the mmW base station 720.

In one configuration, the apparatus 1202/1202' for wireless communication includes means for adjusting a periodicity for performing a beam sweep with a UE based on a channel quality associated with the UE. The beam sweep is a plurality of transmissions of a beam in a plurality of different transmit spatial directions by one of the base station or the UE and a plurality of scans of the beam in a plurality of different scan spatial directions by an other of the one of the base station or the UE. The apparatus further include means for performing the beam sweep at the adjusted periodicity. The apparatus may further include means for receiving a request to adjust the periodicity based on the channel quality and a channel variability associated with the UE. The means for adjusting may be configured to increase the periodicity of performing the beam sweep when the channel quality is less than a threshold quality and the channel variability is greater than a variability threshold, and to decrease the periodicity of performing the beam sweep when the channel quality is greater than a second threshold quality and the channel variability is less than a second variability threshold. The apparatus may further include means for receiving a request to adjust the periodicity based on the channel quality and a handoff condition of the UE. The means for adjusting may be configured to increase the periodicity of performing the beam sweep when the base station is handing off the UE to a second base station or is receiving the UE in a handoff from the second base station, and to decrease the periodicity of performing the beam sweep when the UE is successfully handed off to the second base station or is successfully received in a handoff from the second base station.

The aforementioned means may be one or more of the aforementioned modules of the apparatus 1202 and/or the processing system 1314 of the apparatus 1202' configured to perform the functions recited by the aforementioned means.

It is understood that the specific order or hierarchy of steps in the processes/flow charts disclosed is an illustration of exemplary approaches. Based upon design preferences, it is understood that the specific order or hierarchy of steps in the processes/flow charts may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication of a base station, comprising:
   determining that a channel quality for a user equipment (UE) is less than a threshold quality; and
   commanding one or more base stations to adjust a periodicity of performing a beam sweep with the UE based on comparison of a channel variability to a threshold variability, the comparison being based on whether said channel quality is determined to be less than the threshold quality,
   wherein the commanding comprises commanding a base station serving the UE to increase a periodicity of performing the beam sweep when the channel variability is greater than the threshold variability.

2. The method of claim 1, further comprising determining based on said channel quality that the channel variability is greater than the threshold variability.

3. The method of claim 1, further comprising determining based on said channel quality that the UE needs to be handed off from a first base station to a second base station; and
   commanding at least one of the first base station or the second base station to increase a periodicity of performing the beam sweep with the UE to facilitate the handoff of the UE from the first base station to the second base station.

4. The method of claim 3, further comprising receiving beam sweep result information from the first base station and the second base station that includes beam sweep results from the first base station, the second base station, and the UE, wherein the handoff determination is based on the received beam result information.

5. The method of claim 4, wherein the handoff determination of the UE is further based on knowledge of previous handoffs of UEs from the first base station to the second base station.

6. The method of claim 3, wherein the commanding the at least one of the first base station or the second base station comprises commanding the at least one of the first base station or the second base station to increase the periodicity of performing the beam sweep before the second base station receives the UE in the handoff from the first base station.

7. The method of claim 3, wherein the commanding the at least one of the first base station or the second base station comprises commanding the at least one of the first base station or the second base station to decrease the periodicity of performing the beam sweep after the second base station receives the UE successfully from the first base station in the handoff.

8. The method of claim 3, further comprising:
   forwarding data packets for the UE to the first base station before the UE is handed off to the second base station; and
   forwarding data packets for the UE to the second base station after the UE is handed off from the first base station to the second base station.

9. The method of claim 1, wherein the beam sweep is a plurality of transmissions of a beam in a plurality of different transmit spatial directions by one of a base station or the UE and a plurality of scans of the beam in a plurality of different scan spatial directions by an other of said one of the base station or the UE.

10. A method of wireless communication of a base station, comprising:
   adjusting a periodicity for performing a beam sweep with a user equipment (UE) based on comparison of a channel variability to a variability threshold, the comparison being based on a channel quality associated with the UE, the beam sweep being a plurality of transmissions of a beam in a plurality of different transmit spatial directions by one of the base station or the UE and a plurality of scans of the beam in a plurality of different scan spatial directions by an other of said one of the base station or the UE, wherein the periodicity is increased when the channel variability is greater than the variability threshold; and
   performing the beam sweep at the adjusted periodicity.

11. The method of claim 10, further comprising receiving a request to adjust the periodicity based on the channel quality and the channel variability associated with the UE, wherein the base station increases the periodicity of performing the beam sweep when the channel quality is less than a threshold quality and the channel variability is greater than the variability threshold, and decreases the periodicity of performing the beam sweep when the channel quality is greater than a second threshold quality and the channel variability is less than a second variability threshold.

12. The method of claim 10, further comprising receiving a request to adjust the periodicity based on the channel quality and a handoff condition of the UE, wherein the base station increases the periodicity of performing the beam sweep when the base station is handing off the UE to a second base station or is receiving the UE in a handoff from the second base station, and decreases the periodicity of performing the beam sweep when the UE is successfully handed off to the second base station or is successfully received in a handoff from the second base station.

13. An apparatus for wireless communication, the apparatus being a base station, comprising:
   means for determining that a channel quality for a user equipment (UE) is less than a threshold quality; and
   means for commanding one or more base stations to adjust a periodicity of performing a beam sweep with the UE based on comparison of a channel variability to a threshold variability, the comparison being based on whether said channel quality is determined to be less than the threshold quality,
   wherein the means for commanding is configured to command a base station serving the UE to increase a periodicity of performing the beam sweep when the channel variability is greater than the threshold variability.

14. The apparatus of claim 13, further comprising means for determining based on said channel quality that the channel variability is greater than the threshold variability.

15. The apparatus of claim 13, further comprising means for determining based on said channel quality that the UE needs to be handed off from a first base station to a second base station, wherein the means for commanding is configured to command at least one of the first base station or the second base station to increase a periodicity of performing the beam sweep with the UE to facilitate the handoff of the UE from the first base station to the second base station.

16. The apparatus of claim 15, further comprising means for receiving beam sweep result information from the first base station and the second base station that includes beam sweep results from the first base station, the second base station, and the UE, wherein the handoff determination is based on the received beam result information.

17. The apparatus of claim 16, wherein the handoff determination of the UE is further based on knowledge of previous handoffs of UEs from the first base station to the second base station.

18. The apparatus of claim 15, wherein the means for commanding the at least one of the first base station or the second base station is configured to command the at least one of the first base station or the second base station to increase the periodicity of performing the beam sweep before the second base station receives the UE in the handoff from the first base station.

19. The apparatus of claim 15, wherein the means for commanding the at least one of the first base station or the second base station is configured to command the at least one of the first base station or the second base station to decrease the periodicity of performing the beam sweep after the second base station receives the UE successfully from the first base station in the handoff.

20. The apparatus of claim 15, further comprising:
   means for forwarding data packets for the UE to the first base station before the UE is handed off to the second base station; and
   means for forwarding data packets for the UE to the second base station after the UE is handed off from the first base station to the second base station.

21. The apparatus of claim 13, wherein the beam sweep is a plurality of transmissions of a beam in a plurality of different transmit spatial directions by one of a base station or the UE and a plurality of scans of the beam in a plurality of different scan spatial directions by an other of said one of the base station or the UE.

22. An apparatus for wireless communication, the apparatus being a base station, comprising:
   means for adjusting a periodicity for performing a beam sweep with a user equipment (UE) based on comparison of a channel variability to a threshold variability, the comparison being based on a channel quality associated with the UE, the beam sweep being a plurality of transmissions of a beam in a plurality of different transmit spatial directions by one of the base station or the UE and a plurality of scans of the beam in a plurality of different scan spatial directions by an other of said one of the base station or the UE, wherein the periodicity is increased when the channel variability is greater than the variability threshold; and
   means for performing the beam sweep at the adjusted periodicity.

23. The apparatus of claim 22, further comprising means for receiving a request to adjust the periodicity based on the channel quality and the channel variability associated with the UE, wherein the means for adjusting increases the periodicity of performing the beam sweep when the channel quality is less than a threshold quality and the channel variability is greater than the variability threshold, and decreases the periodicity of performing the beam sweep when the channel quality is greater than a second threshold quality and the channel variability is less than a second variability threshold.

24. The apparatus of claim 22, further comprising means for receiving a request to adjust the periodicity based on the channel quality and a handoff condition of the UE, wherein the means for adjusting increases the periodicity of performing the beam sweep when the base station is handing off the UE to a second base station or is receiving the UE in a handoff from the second base station, and decreases the periodicity of performing the beam sweep when the UE is successfully handed off to the second base station or is successfully received in a handoff from the second base station.

* * * * *